June 22, 1937.  J. V. MARTIN  2,084,694
AERODYNAMIC AUTO
Filed Nov. 14, 1929  11 Sheets-Sheet 1
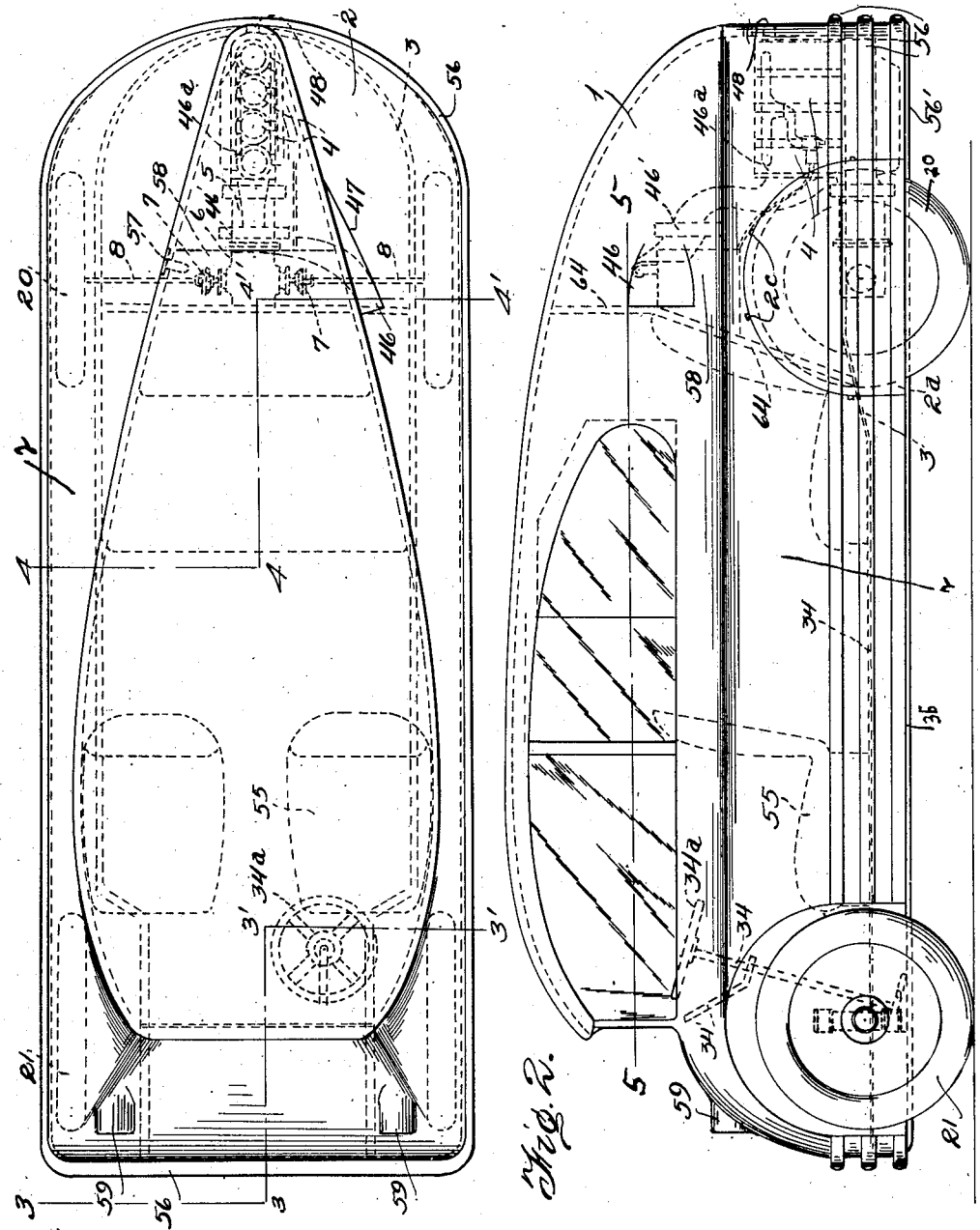
INVENTOR.
James V. Martin
BY
Jas. V. Martin
ATTORNEY.

June 22, 1937.　　　J. V. MARTIN　　　2,084,694
AERODYNAMIC AUTO
Filed Nov. 14, 1929　　11 Sheets-Sheet 2

Fig. 3.

INVENTOR.
James V. Martin
BY Jas. V. Martin
ATTORNEY

June 22, 1937.　　　J. V. MARTIN　　　2,084,694
AERODYNAMIC AUTO
Filed Nov. 14, 1929　　　11 Sheets-Sheet 3

Fig. 4.

INVENTOR.
James V. Martin
BY Jas. V. Martin
ATTORNEY.

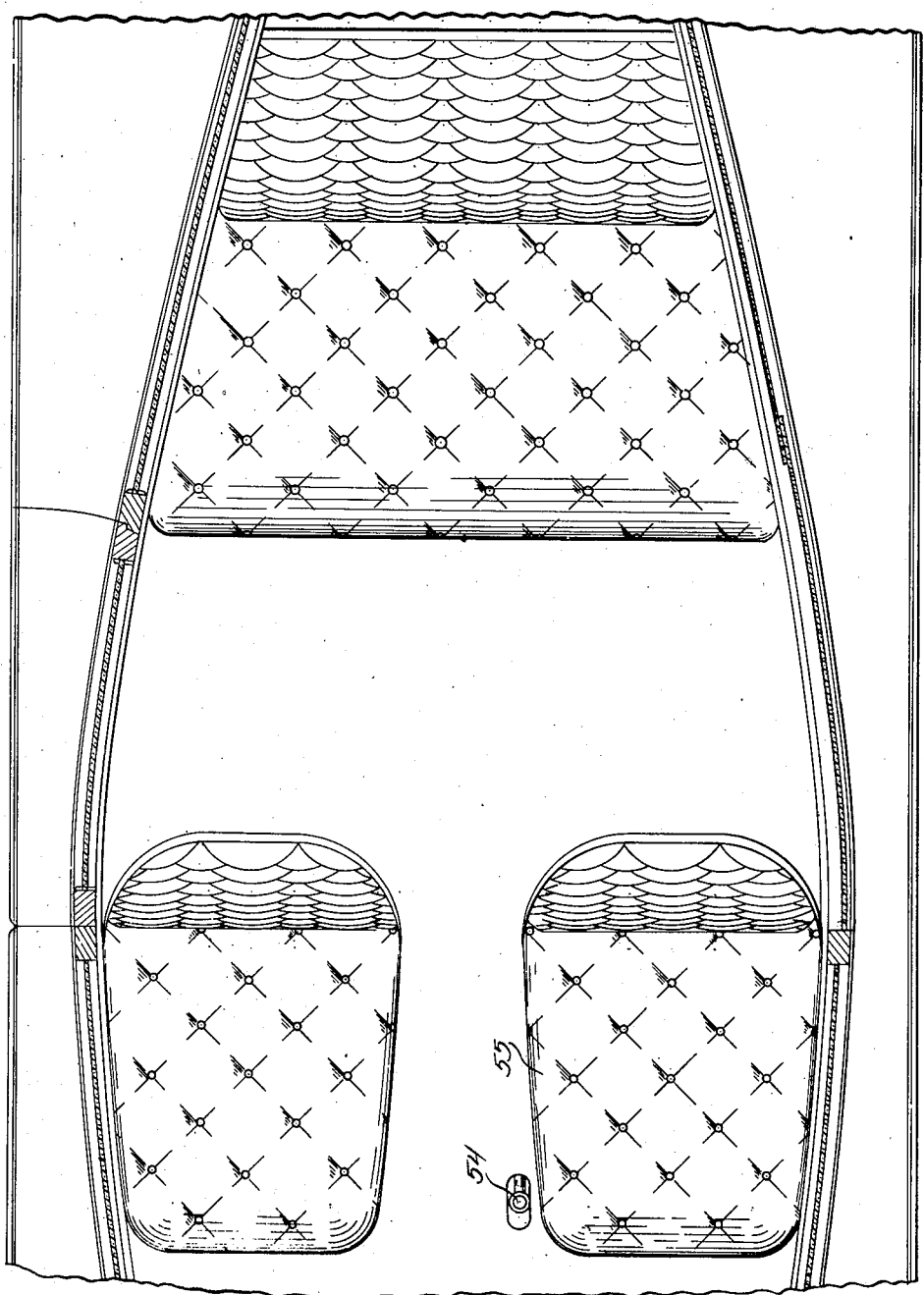

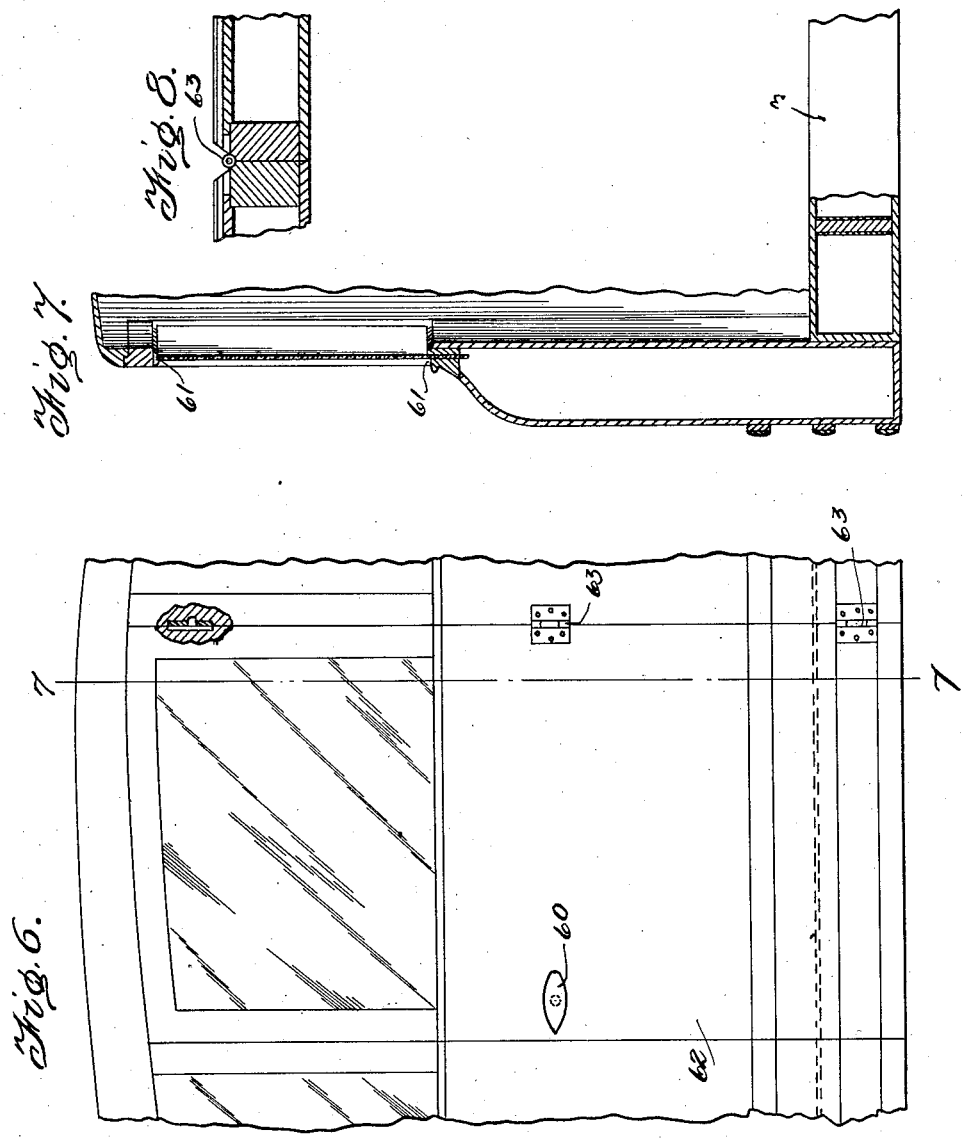

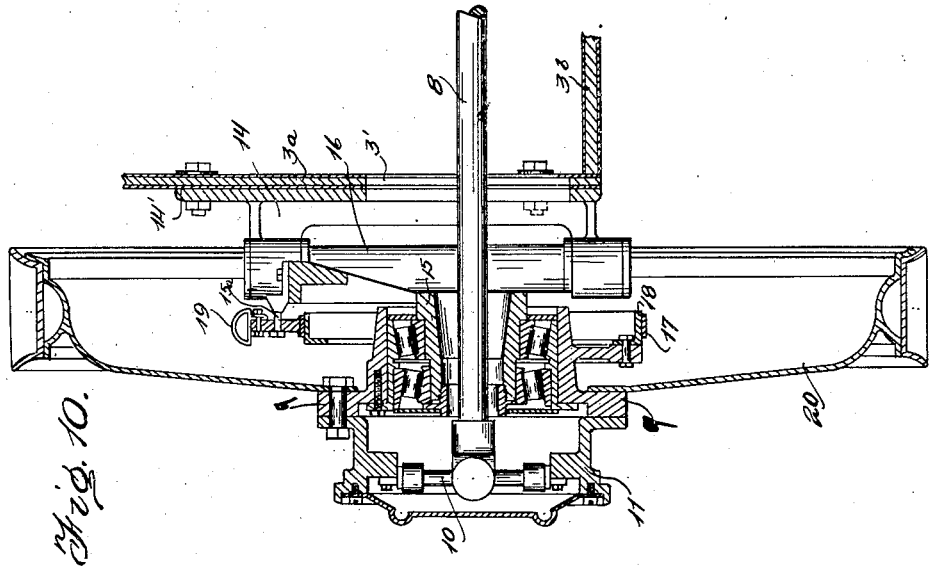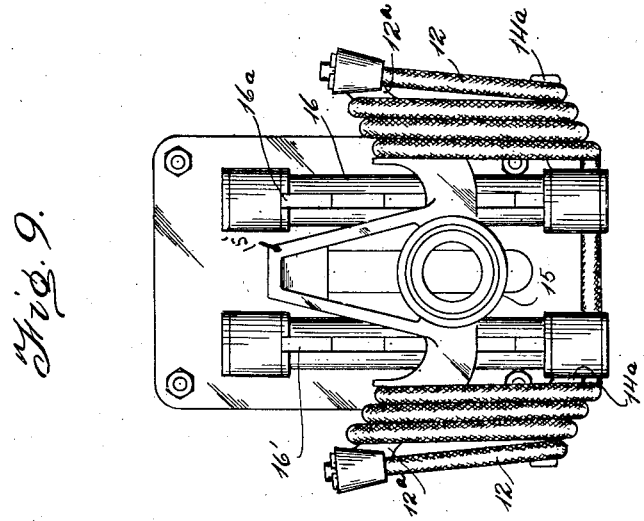

June 22, 1937. J. V. MARTIN 2,084,694
AERODYNAMIC AUTO
Filed Nov. 14, 1929 11 Sheets-Sheet 7

INVENTOR.
James V. Martin
Jas. V. Martin
BY
ATTORNEY

June 22, 1937.    J. V. MARTIN    2,084,694
AERODYNAMIC AUTO
Filed Nov. 14, 1929    11 Sheets-Sheet 8
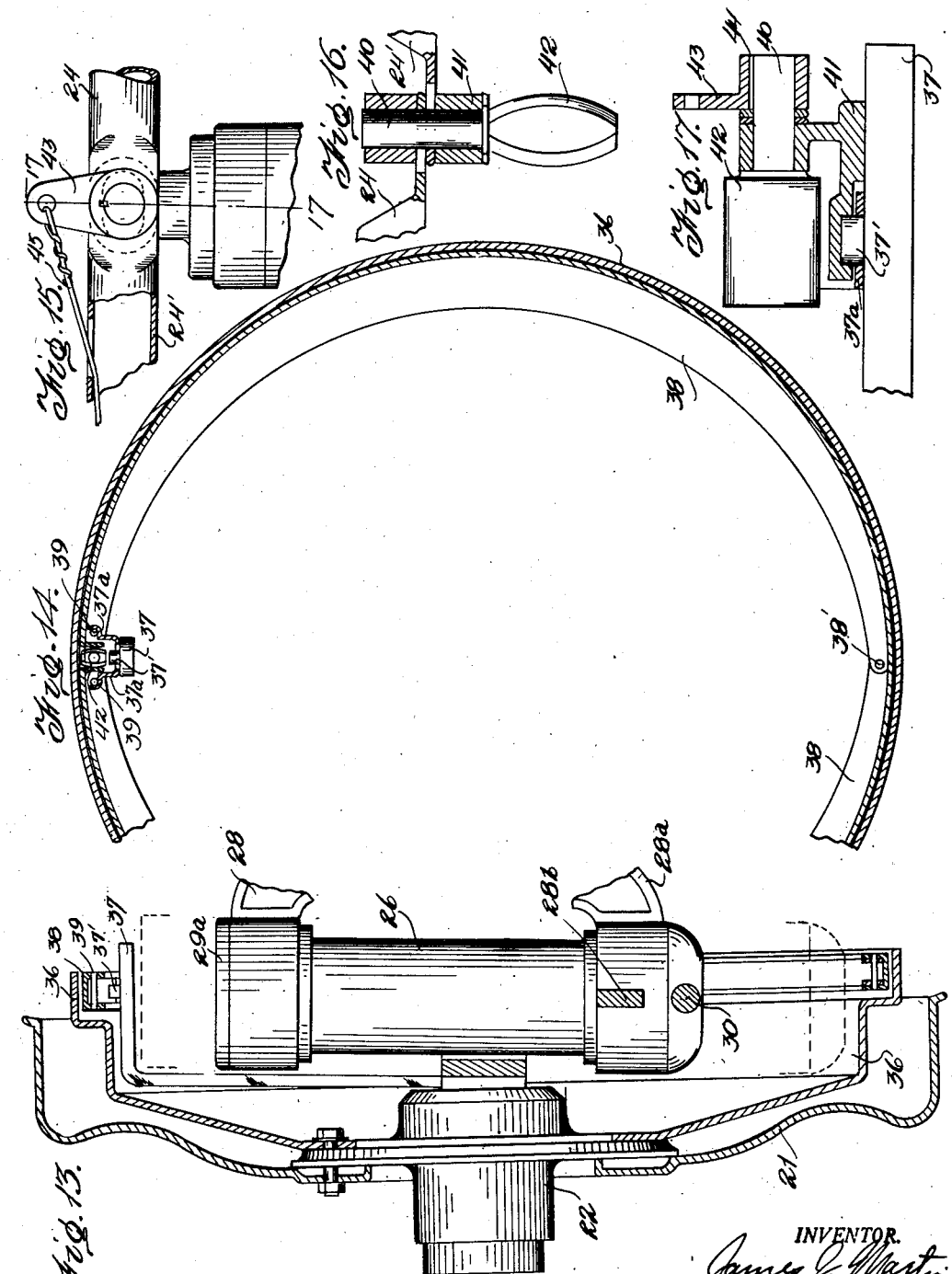
INVENTOR.
James V. Martin
BY
Jas. V. Martin
ATTORNEY June 22, 1937.  J. V. MARTIN  2,084,694
AERODYNAMIC AUTO
Filed Nov. 14, 1929  11 Sheets-Sheet 9
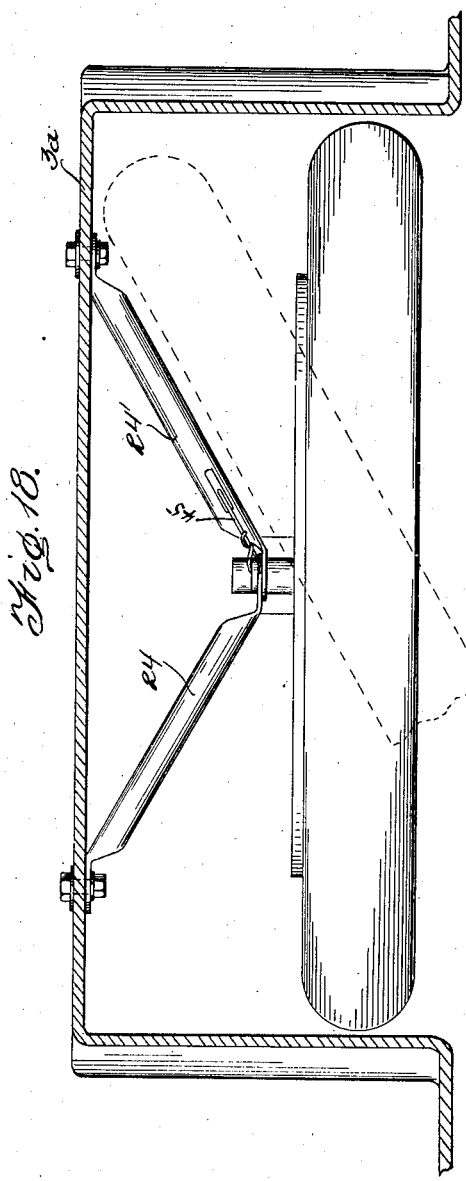
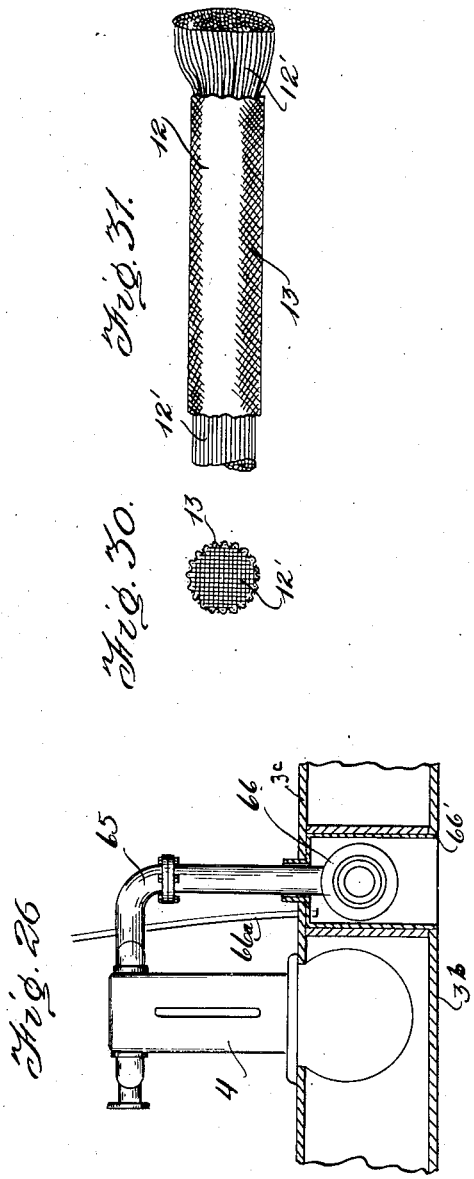
INVENTOR.
James V. Martin
BY Jas. V. Martin
ATTORNEY.

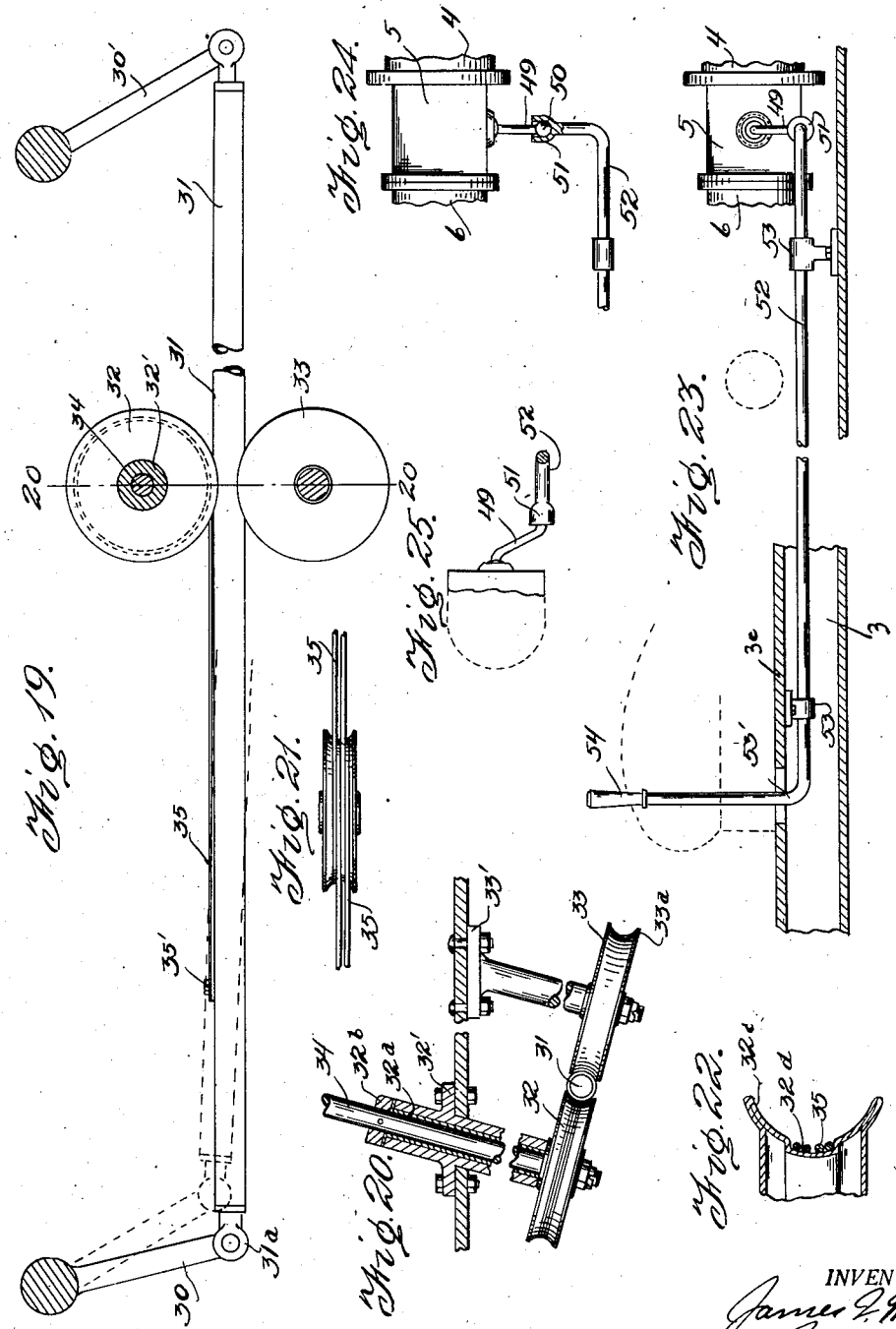

June 22, 1937.  J. V. MARTIN  2,084,694
AERODYNAMIC AUTO
Filed Nov. 14, 1929   11 Sheets-Sheet 11
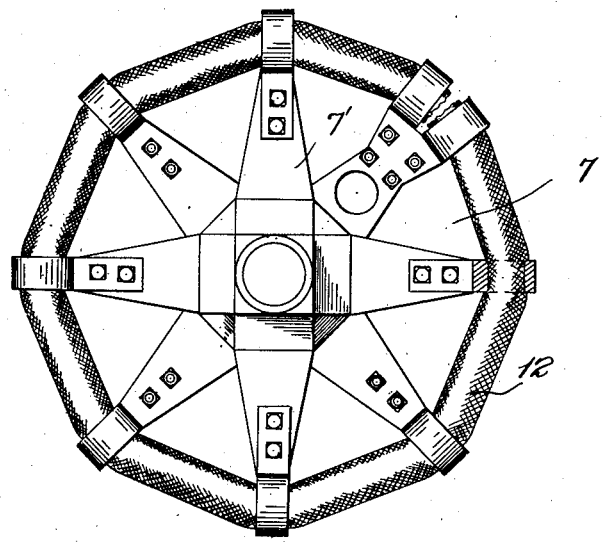
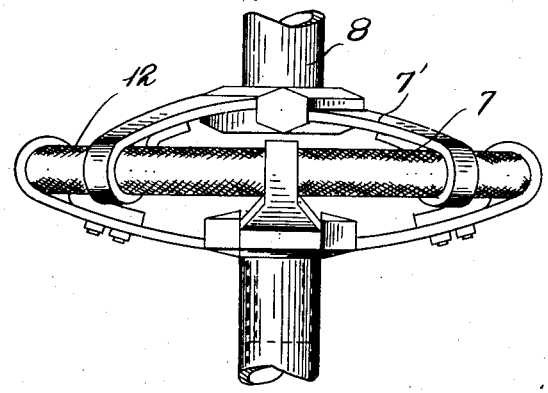
INVENTOR.
James V. Martin
BY Jas. V. Martin
ATTORNEY.

Patented June 22, 1937

2,084,694

UNITED STATES PATENT OFFICE 2,084,694

AERODYNAMIC AUTO

James V. Martin, Garden City, N. Y.

Application November 14, 1929, Serial No. 407,131

23 Claims. (Cl. 180—1)

My invention relates to automobiles and more particularly to improvements in the form and arrangement of the parts of automobiles with a view to reducing the wind resistance at high speed. More than half the usual motor power is required at speeds above 60 miles per hour to overcome the wind resistance created by the conventional closed body automobile, and even where certain attempts have been made in recent years to streamline autos the results have been far from perfect due to a number of causes, principal among which the following should be mentioned: The rear mud guards or other obtrusions have ruined the otherwise even flow of air; the under portion of the automobile which not only creates drag because of the unevenness of its parts there exposed, but also ground interference as well, has been neglected as to streamlining and most of the forms used have tended to lift the drive wheels from the road. If the side walls are carried outwardly beyond the wheels to improve the even air flow they will be ripped off from contacts unless special protection such as a guard strip be added, but a guard strip so low down on the side wall as to be approximately level with the wheel centers requires the special reinforcement such as a continuous lower body bottom will provide, but since this, for easy riding, must move up and down, individual wheel springing becomes necessary for road clearance.

It is the primary object of the present invention to obviate, in so far as practicable, the above difficulties and to provide a simple and efficient form of suspension and drive which lends itself to the perfect type of streamlining for automobiles.

A further object of the invention is to provide a protected form of steering gear, housed against injury from obstacles on the road and greatly simplifying the steering mechanism.

A still further object of my invention is to provide a means by which automobiles may come into actual contact with each other without ripping fenders, and the like, apart.

A further object of my invention is to provide internal brakes and front wheel brakes for the new type of suspension which I have invented and which is disclosed in various forms in my copending applications Nos. 65,596, filed October 29, 1925; 91,130 filed Feb. 27, 1926, and 355,839 filed April 17, 1929.

A further object of my invention is to provide a remote control for the power unit and to dispose the passengers and motor relatively to the advantage of streamlining the closed body.

Other objects of my invention will appear as the description proceeds with reference to the following drawings:—

Fig. 1 is a plan view looking down upon my invention and indicating in dotted lines the locations of principal parts.

Fig. 2 is a view in side elevation also revealing in dotted lines certain internally located parts.

Fig. 3 is a combined external front elevation of the right hand side of the four passenger automobile illustrated and an internal sectional view looking rearward from in front of the driver's seat, but omitting the steering column, taken along the lines 3—3 and 3'—3', of Fig. 1.

Fig. 4 is a composite view showing in front elevation two views partly in section taken along the lines 4—4 and 4'—4' of Fig. 1.

Fig. 5 is a plan view of the interior seating arrangement taken along the line 5—5 of Figs. 2 and 3 and Fig. 6 is a side elevation of the door, while Figs. 7 and 8 disclose sectional details of the said door.

Fig. 9 is a side elevation of one of the rear wheel supporting brackets and Fig. 10 shows, partly in section, how this bracket is attached to the automobile body side wall and to the drive wheel.

Figure 12:
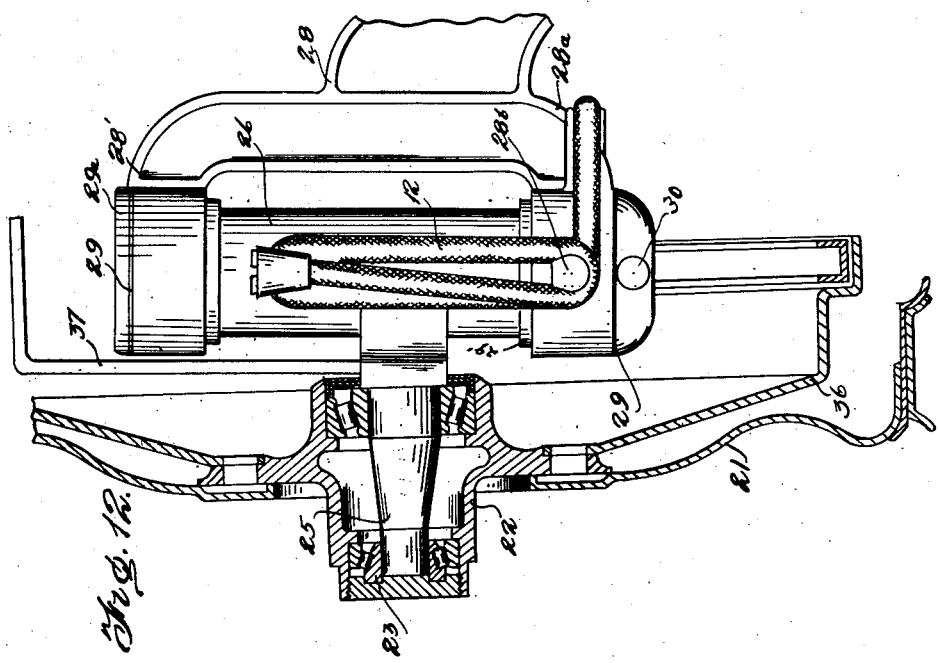
Figure 11:
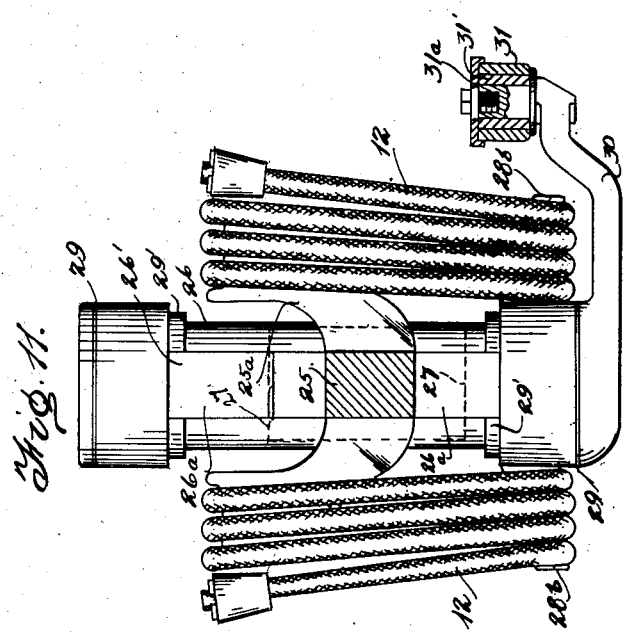

Fig. 11 shows the method of front springing by a vertical guide bracket shown in side elevation, while Fig. 12 shows the same viewed from the rear and as attached to a steering wheel and front wheel brake shown in section. Fig. 13 shows, partly in section, the front wheel, brake and guide housing as viewed from the rear of the left front wheel. Fig. 14 shows the position of the braking means within the brake drum viewed from the vehicle. Fig. 15 shows an enlarged view of the brake torque arms' connection with the brake operating means and Fig. 16 a still more detailed illustration of this detail in section, while Fig. 17 shows, partly in section, a view in elevation taken along the line 17—17 of Fig. 15. Fig. 18 shows the front steering wheel and the brake torque arms looking down upon them in plan view.

Fig. 19 is a view of the simplified steering means looking down upon same as it would appear from a position above the steering hand wheel, while Fig. 20 discloses the detail in section of the said means taken along the lines 20—20 of Fig. 19. Fig. 21 shows the flanged pulley wheel attached to the steering column and the flexible cables to the steering tie rod, while Fig. 22 shows these cables and the pulley wheel in section.

Fig. 23 is a view in longitudinal elevation showing the location of the gear shift shaft within the boxed-in lower portion of the auto body.

Fig. 24 shows a view looking down upon the top of the gear box and shows in section the socket for the gear shift lever. Fig. 25 shows the same lever viewed from forward.

Fig. 26 is a view of the lower boxed-in portion of the auto shown in section as viewed from the rear and showing the motor mounted on the said section and an exhaust leading to a muffler, which is located in an indentured pocket of the said portion.

Figs. 27, 28, and 29 show views respectively in elevation, plan and partly in section of a new type of universal joint using rubber already held in tension by the external wrapping of same as more clearly disclosed in Figs. 30 and 31 which show respectively the rubber cords within their wrapping in cross section and the cords as under tension held tightly in place by the web-like covering. Proceeding now with the more detailed disclosure of the invention, similar numerals refer to similar parts throughout the several views:—

1 indicates the upper portion of a closed automobile body having a tapering streamlined form and 2 the lower portion of the said streamlined body mounted upon a reinforced bottom portion 3 which supports the power unit 4; this power unit is built rigidly with the transmission or gear box 5 and with the differential or rear drive 6 to the rear wheels. Universal joints 7 drive torque shafts 8 which continue through a slot 3' in the body side wall 3a through the wheel hub 9 to another universal joint 10 located in the wheel hub cap 11, see Fig. 10. The main strength of the automobile is contributed by the bottom portion 3, see Figs. 1 and 2 and 3 and 10, which is constructed of strong light material such as laminations of wood and metal, such as illustrated as 3a of Fig. 10, also at 3b of the same figure. These portions unite with the body floor 3c and the partitions 3d to make a rigid structure which substitutes for the conventional automobile chassis frame and which furnishes a staunch backing for the wearing strips 56.

The suspension employed is quite novel in that the rubber cords 12 employed to replace steel springs are made up of small bands 12' which are held under constant tension by a web type fabric cover 13. This feature not only protects the rubber from the light and air, as the tension of the rubber keeps the fabric threads in close contact with each other, but I have found that rubber in tension has a much longer life than under compression or free of stress and while rubber in this form has been long in public use on aeroplane chassis I am giving it a new function by combining it with the stub axle of an automobile where the stub axle permits individual springing and where the rubber because of its initial tension can be made so that it will support the static weight of the automobile without the necessity of stretching the cords 12 about the arms 12a of the brackets 14, which are bolted at 14' to the side wall 3a of the body bottom 3.

The rear stub axle 15 is guided by internally located vertical guides automatically lubricated by impregnated oil bushings and which are protected from dust by the telescopic plates 16' which close the slot 16a in the cylinder 16, see Figs. 9 and 10. Lower bracket arms 14a carry the weight of the rear end of the auto yieldably through the rubber cords 12 and it will be noticed that when the static load is relieved as when a jack takes the load off the wheels the arms 12a and 14a will come close together to the extent represented by the lower part of the slots 16a, Fig. 9, and it is proposed that the initial tension built into the rubber cords 12 shall equal the static load for the given movement, so that the webs of the covering will be completely together and holding the rubber in tension when the two sets of arms are together. Thus it will not be necessary for anyone attaching the cords to the arms to put same under tension by hand and the cords can be furnished by the manufacturer to a prescribed length and tension.

An external brake band 17 fits about a brake drum 18 which is rigid with the hub portion 15' and the pin 15a carries the weight of the braking mechanism in an elongated slot so that the tube 19 can take all the brake torque to the body side wall 3a after the same fashion that one of the front wheel brake rods 24, Fig. 18, takes the brake torque to the forward bottom body portion. Naturally internal rear brakes can be fitted after the fashion shown in Figs. 18, 13, and 14.

The wheels 20 can be of any approved disk pattern providing room for the internally disposed shock absorber brackets and brakes.

Looking now at the forward suspension and braking, Figs. 11 and 12, 13, 14, 15, 16, 17, and 18, we find the front steering wheels 21 associated in conventional manner with a hub 22 supported upon roller bearings 23 about a stub axle 25; this stub axle is guided vertically within the cylinder 26 by a vertically elongated guide 27 indicated by dotted lines in Fig. 11. The slot 26' is kept closed against ingress of dirt by telescopic plates 26a. The bracket 28 carries the body weight through the forked arms 28' and 28a and to the cord holder arms 28b from which the weight is suspended by the cords 12 to the arms 25a carried by the spindle 25. The arms are radiused to prevent chafing the cords.

The cylinder 26 turns for steering within oil impregnated bushings held in the forked ends of bracket 28 and which have a flange visible at 29. The tie rod lever 30 may be directly secured to the cylinder 26 or it may be connected through a square with a sliding fit to the internal guide 27 of the spindle 25 as more fully shown in my co-pending application Serial No. 355,839 heretofore referred to; 29' indicates inset rings on the cylinder 26 to hold the cylinder in place within its bushings 29, and 29a is a cap screwed into the inside of the cylinder 26 also to hold same in place on its bushings. A steering tie rod 31, Figs. 19 and 20, is journalled about the upturned end of lever 30 about an oil impregnated bushing 31' kept clean against dirt by the cap 31a. The tie rod passes between two flanged pulleys located within the closed box-like section 3 of the auto bottom portion and journalled to suitable brackets therewithin, 32' and 33' respectively, attached to portions of the said bottom 3. A suitable elongated hole in the side wall 3a allows the tie rod 31 to pass through the bottom 3 to the corresponding lever 30' on the right hand wheel 21 to steer the same.

A steering column 34 is held by a bracket 34', Fig. 2, and is operated by a hand steering wheel 34a. At its lower end this column 34, Fig. 20, is held in place by the bracket 32', within an oil impregnated bushing 32a capped against dust at 32b; this bracket also centers the pulley 32 which is rigid with the column 34. The pulley 32 is recessed at 32d, see Fig. 22, so as to fit four flexible cables 35, two of which are attached to the tie rod at 35' and the other two to a similar point on the other side of tie rod 31. The flanges 32c and 33a are intended to keep the steering tie rod 31 evenly centered for movement and they are located as indicated (see dotted lines) so as to hold the said tie rod in a mean position relative its fore and aft movement. It is contemplated that the slight bending required in practice for the rod 31 will be well within its elastic limits and do no harm.

Looking now at the front wheel brakes, Figs. 12, 13, 14, 15, 16, 17, and 18, we find a brake drum 36 carried by the hub 22, while the spindle 25 has an upwardly extending part 37 having a round blunt pin 37' on top of its L-shaped head. A U-shaped plate of spring steel 37a rests upon the said L head of 37 and is guided for slight movement by the pin 37'. The internal shoes 38 are journalled together at 38' and have two pins 39, one in the top of each shoe and each pin fitted into one respective end of the said spring plate 37a so that the spring in the said plate holds the two shoes together normally so that they do not engage the inside braking surface of the brake drum 36.

Two brake torque tubes 24 and 24' lead from journalled attachments on the body wheel house portion 3a to a cam shaft 40, supported upon a bracket 41 which is slidably supported on the L head 37 and guided in two directions by the pin 37'. This cam shaft 40 has a cam 42 which engages between the two upper ends of the shoes 38 to force the same apart against the spring plate 37a and into engagement with the inside surfaces of brake drum 36, it is operated by the lever 43 which is keyed to the shaft 40 at 44 while the lever 43 is actuated by a pull rod or wire 45 leading from the driver's position through suitable leads and through the tube 24'.

Referring again to the motor which is shown as a four cylinder air cooled type, this is indicated by dotted lines in Figs. 1 and 2 and as numeral 4 in Figs. 4 and 26; it is cooled by air gathered along the streamlined side of the body upper portion 1 into a scoop 46, having a rearwardly streamlined part 47 and leading as shown by dotted lines to a fan chamber 46' which forces the air through a jacket 46a along the motor cylinders to an exit 48 in the rear of 1.

The differential housing 6 and the gear box 5 are one unit with the motor 4 and as such secured directly to the lower body portion 3, a gear shift lever 49 protrudes through the side of the gear box and has a ball joint on its end 50 engaging with a socket of bell form 51 on the bent end of a shaft 52 slidably journalled in brackets 53 having oil impregnated bushings and attached to the inside of the body bottom portion 3; the forward end of the shaft is bent upwardly through the floor 3c at 53' and leads to a handle 54 alongside the driver's seat 55.

The driver's seat 55 is arranged behind the steering column 34 and to one side and rearwardly of the left front wheel housing 2' which serves in a new and double way in my invention over conventional practice, i. e. this wheel housing serves to make the forward portion of the body smooth for the passage of air along its side and in front and at the same time forms a mud guard; it also forms a strong back rest for wearing strips 56 which surround the body portion 3 running horizontally from front to rear and are designed to resist deformation and permit considerable collision shock without injury to the auto body, since it is braced by such a strong box-like bottom portion and being of rounded external form and laminated for additional strength. These wearing strips are also designed to obviate much of the daily wreckage now caused by the tearing of fenders and bumpers, since the smooth and continuous nature of the wearing strips is not conducive to catching onto parts of other automobiles, but tends to deflect blows. Skids 56' on the bottom of 3b have a like function in protecting the parts of the machinery like the steering tie rod 31 and the motor crank case from injury. Fig. 7 shows the wearing strips 56 in section made up of laminations similar to the body side walls, with metal outside to ward off blows and a wood backing to reinforce the metal. Naturally the smooth bottom 3b continuing from front to rear of the auto greatly lessens both the drag of the auto and the ground interference of same.

The rear of the car is most important from the standpoint of streamlining, the bottom and sides have been left unstreamlined for the most part, but are much smoother for airflow, especially that passing the rear wheels, than former disclosures show, while the front, being comparatively unimportant is not streamlined.

The entire body is made as smooth as possible in front, on the sides and in the rear. It is often worse to have a smooth body which abruptly runs into a rear mud guard, than not to attempt streamlining at all, because once the air begins to flow smoothly and rapidly along a surface, it will be further deflected and will create more vortices than if the entire side of the auto were rough like present practice, therefore I have inclosed the rear drive wheels to a considerable extent within the rear wheel housings 2a and at the same time I have made the wheel and tire accessible through a removable part 2b attached at 2c.

All obtrusions have been suppressed so far as possible as for example the door hinges 63 and the gasoline filler cap 57 which leads into the gas tank 58, and those things left external, such as the headlights 59 and the door knob 60 have been streamlined. Also the glass in the job has been brought very close to the external wall, see 61 of Fig. 3, so as to make as little disturbance of air as possible and the two side panels of glass near the front have been curved to aid the streamline effect.

There is but one door 62, located on the right side of cars using that side of the street; this is hinged on the lower outside of the body portion 3 and has continuations of the guard strip on it and space between the two front seats permits passage from in front of the rear seat forward. The glass panels to rearward on the left side of the body slide instead of dropping down to open and a glass window 64' in the sound and smell insulator partition 64 permits vision aft to and through another window 64a in the outside wall of 1, see Fig. 4. The universal joints 7 shown in detail in Figs. 27, 28, and 29 have springs which fit into forms 7a and about the rubber cords 12 as shown and afford extreme flexibility and end play for considerable angles of drive.

Looking at Fig. 26 it will be seen that the exhaust pipe 65 from the motor 4 leads to the muffler 66 through the upper floor 3c into a metal lined and insulated pocket 66' open to the air at its bottom, and this pocket is cooled by air from the fan housing 46' through a bypass 66a.

Having thus described the detail of my invention it will be understood that considerable changes and modifications of detail may be made without departing from the spirit and scope of the invention, which, as shown in Figs. 1, 2, 3, and 4 affords a body position so low that the floor of the passenger compartment is actually below the wheel centers, nevertheless the ground clearance of the auto disclosed compares most favorably even with much longer wheel base cars and the room inside also compares favorably with much larger cars, but the overall heighth is considerably less. It is contemplated that practical autos like that disclosed in Figs. 1 and 2 can have a wheel base of about 85 inches and be one foot narrower than present conventional models and have 9 inches normal road clearance.

The substitution of wearing streaks for fenders will save thousands of dollars per day in removing the numerous accidents due to parts protruding from conventional cars and the smooth external lines of the car tapering toward the rear approximate true streamlines thus reducing wind resistance at high speed much more effectively than previous efforts. Obviously the above advantages are made possible by my new form of suspension and drive which eliminates the cumbersome chassis frame and steel springs, by substituting rubber already under tension held within a protected wrapping which is associated with stub axles guided vertically along the body side wall.

What I claim is:—

1. An automobile having two steering wheels and a body portion extending downwardly between the said wheels below the centers thereof, a steering tie-rod connecting the said wheels and passing through an aperture in the said body portion, resilient means for vertical movement between the said wheels and the said body and the said tie-rod moving with the body in respect to such vertical movement.

2. The combination in an automobile having a closed streamlined body of two steering wheels located in the forward portion thereof, guide brackets extending from the said body and supporting each said wheel yieldably therefrom and a steering tie-rod participating with the body in said yieldable movement and connecting the two said wheels.

3. An automobile having two steering wheels, yieldably guided for vertical movement within an inclosed guide, said guide journalled to turn horizontally on a bracket extending from the body of the said automobile and each said wheel provided with a brake and means to absorb the torque of the said brakes independently of the said guides.

4. In combination with a road vehicle, a guide bracket yieldably supporting a stub-axle of one of the vehicle wheels for vertical sliding movement within a vertically elongated portion of the said bracket, an internal type of expanding brake fitted within a brake-drum secured to the said wheel and a radius rod means of transferring the torque of the said brake to the said body so that the said guide bracket does not receive the said torque.

5. The combination with the steering wheels of an automobile, an automobile body, a steering column and a tie-rod, the said tie-rod connecting the said wheels to steer the same from an operating connection between the said tie-rod and the said column and means for vertical yieldable support of the said tie-rod and column on the said wheels and the said tie-rod passing through the said body above the bottom thereof.

6. In combination with an automobile body, steering road wheels, a vertical sliding guide intervening between the said body and each of the said wheels, a brake for each of the said wheels and means to absorb the brake torque within the lower portion of the said body without passing the said torque through the said guide.

7. In combination with an automobile body, brackets provided with inclosed vertical guides supporting the said body on steering wheels for yieldable vertical sliding movement in the said guides and means to apply a braking action to the said wheels, the said means conducting the brake torque into the said body without passing it through the said guides.

8. In combination with an automobile body having a reinforced lower body portion, an exhaust muffler located within the confines of the said portion and having heat insulating means separating it from the said portion.

9. An automobile having a body with a double bottom and vertical yieldable means between its steering column and its road wheels, a steering tie-rod passing through the said double bottom and having the aforesaid means supporting it upon the said wheels.

10. In an automobile having a passenger seat located forward of a motor therefor, an air tight partition separating the said seat and motor, a streamline cover for said seat and motor forming an airtight connection with the said partition and an air scoop admitting air adjacent the said motor through the said cover, on the side thereof.

11. In combination with an automobile having a double bottom body, the lower portion of which extends downwardly beyond the centers of its steering wheels and forward of the front thereof, a tie-rod steeringly connected with the said wheels and passing through the said double bottom and each of the said wheels being independently sprung to the said double bottom.

12. A combination according to claim 11 and means within the said double bottom to operatively attach the steering column of the said automobile to the said tie-rod.

13. A combination according to claim 11 and a rearwardly disposed drive wheel enclosed within a streamline cover extending from the forward part of the said double bottom and continuing around the top of the said steering wheels and then down again to form a union with the lower part of the said double bottom, the side walls of the said streamline cover converging into each other to rearward of a rear drive wheel.

14. An automobile having an inclosed streamlined body extending outwardly beyond the steering wheels in front and on the sides thereof and continuing past the outer upper part of the rear drive wheels, the said walls being substantially parallel with the plane of rotation of the said drive wheels and converging to rearward thereof, each of the said drive wheels being individually sprung and a smooth body bottom passing under the drive mechanism to the said wheels from one side of the automobile to the other.

15. An automobile having two drive wheels, each said wheel located with its upper part within a wheel housing, an inner wall for each said housing separating the wheel of that housing from the inside of the said automobile, substantially smooth side walls for the said automobile located outwardly beyond the said wheels and downwardly beyond their centers, a guard strip extending along the lower margin of the last said walls and converging rearwardly together with the said walls, means to drive both said wheels from a location within the said automobile and between the said inner walls and a continuous bottom, rigid under said drive means, extending from front to rear lower margins of the said wheel housing on one side to corresponding positions of the wheel housing on the opposite side.

16. An automobile having a smooth bottom extending below its motor and other driving mechanism and from front to rear and between the wheels thereof, a muffler located above the said bottom for the exhaust of the said motor and means for forcing and confining air along the sides of the said muffler to cool the same.

17. In combination with an automobile having its speed altering mechanism located rearwardly of the passenger seat, a tube or shaft moving in guides under the automobile floor and connecting the said mechanism with a hand lever near the driver's seat and the said lever imparting both a rocking and sliding movement to the said tube or shaft to alter the said speeds.

18. In combination with a streamlined automobile having road wheels positioned inwardly of the streamlining walls, a guard strip having a continuously smooth outer surface attached to the lower margins of the said walls and continuing past a rear wheel, a removable panel carrying a section of the said guard strip past the said rear wheel and means available from the outside, of the said panel to detach it.

19. The combination of an automobile body floor and two steering wheels, the said floor yieldably and individually supported on each of the said wheels so that it moves vertically between their centers and extends in an unbroken plane forwardly and rearwardly of the said wheels' centers.

20. The combination of an automobile body floor and two steering wheels, the said floor yieldably supported on the said wheels so that it moves vertically between their centers and extends in an unbroken plane forwardly and rearwardly of the said wheel centers and a body sill formed integral with the said floor and providing an anchorage for vertical guide brackets for two driving wheels, and a flexible drive means passing through an aperture in the said sill to drive the said drive wheels.

21. An automobile body and wheel combination wherein the body side wall extends outwardly beyond the outsides of the said wheels, a guard strip extending horizontally at the approximate plane of the wheel centers and attached to the said wall forwardly and rearwardly of the two forward wheels and passing uninterruptedly past a rear drive wheel and the said guard strip having a curved face of metal backed by more flexible material.

22. An automobile body and wheel combination wherein the body side wall extends outwardly beyond the outside of the said wheels, a guard strip extending horizontally at the approximate plane of the wheel centers and attached to the said wall forwardly and rearwardly of the two forward wheels and passing uninterruptedly past a rear drive wheel and a section of the said guard strip located between two of the said wheels and attached to a door of the said body.

23. In an automobile having two road drive wheels, a streamlined body sprung relative said wheels and with walls positioned outwardly beyond them, an inner wall separating each of the said wheels from a driving means for both, a guard strip at the lower margin of the said outer walls and a body bottom bracing the said guard strip from the outer wall on one side to the outer wall on the opposite side of the said body, the said bottom built rigid, continuous and unbroken between the said inner walls and under the said driving means, whereby the said driving means is at all times separated from road obstacles by the said bottom and the said bottom remains closed for all positions of springing.

JAMES V. MARTIN.